United States Patent
Schuh et al.

(10) Patent No.: US 9,299,979 B2
(45) Date of Patent: Mar. 29, 2016

(54) METHOD FOR PRODUCING A STORAGE STRUCTURE OF AN ELECTRICAL ENERGY STORAGE CELL

(71) Applicant: Siemens Aktiengesellschaft, Munich (DE)

(72) Inventors: Carsten Schuh, Baldham (DE); Thomas Soller, Deggendorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/398,465

(22) PCT Filed: Apr. 24, 2013

(86) PCT No.: PCT/EP2013/058507
§ 371 (c)(1),
(2) Date: Nov. 2, 2014

(87) PCT Pub. No.: WO2013/171044
PCT Pub. Date: Nov. 21, 2013

(65) Prior Publication Data
US 2015/0111133 A1    Apr. 23, 2015

(30) Foreign Application Priority Data
May 15, 2012   (DE) .......................... 10 2012 208 112

(51) Int. Cl.
*H01M 4/04* (2006.01)
*H01M 4/1391* (2010.01)
(Continued)

(52) U.S. Cl.
CPC .............. *H01M 4/1391* (2013.01); *B22F 3/11* (2013.01); *B22F 3/26* (2013.01); *C04B 38/0032* (2013.01); *C22C 33/0242* (2013.01); *H01M 4/043* (2013.01); *H01M 4/0416* (2013.01); *H01M 4/0471* (2013.01); *H01M 4/8615* (2013.01);
(Continued)

(58) Field of Classification Search
None
See application file for complete search history.

(56) References Cited

U.S. PATENT DOCUMENTS

| | | | |
|---|---|---|---|
| 4,204,033 A | 5/1980 | Meissner | |
| 2006/0063051 A1 | 3/2006 | Jang | |

(Continued)

FOREIGN PATENT DOCUMENTS

| | | |
|---|---|---|
| CN | 101302361 A | 11/2008 |
| CN | 102201570 A | 9/2011 |

(Continued)

OTHER PUBLICATIONS

Zhao X. et al: Performance of Solid Oxide Iron-Air Battery Operated at 550° C.; Journal of the Electrochemical Society; vol. 160; No. 8; pp. A1241-A1247; DOI: 10.1149/2.085308jes; XP055065462; Mar. 25, 2013.

*Primary Examiner* — Patrick Ryan
*Assistant Examiner* — Wyatt McConnell
(74) *Attorney, Agent, or Firm* — Beusse Wolter Sanks & Maire

(57) ABSTRACT

A method for producing a storage structure of an electrical metal-air energy storage cell is provided, having an active storage material and an inert material, the method including the following steps: producing a porous green body, which includes the active storage material, infiltration of the porous green body with an infiltration medium, which contains the inert material, and heat treatment of the infiltrated green body to produce an inert enveloping structure, which at least partially envelops grains of the active storage material.

11 Claims, 4 Drawing Sheets

(51) Int. Cl.
*B22F 3/11* (2006.01)
*B22F 3/26* (2006.01)
*H01M 4/86* (2006.01)
*H01M 12/06* (2006.01)
*C22C 33/02* (2006.01)
*C04B 38/00* (2006.01)
*B22F 3/24* (2006.01)
*C04B 111/00* (2006.01)
*H01M 4/02* (2006.01)

(52) U.S. Cl.
CPC ........ *H01M 12/065* (2013.01); *B22F 2003/248* (2013.01); *B22F 2998/10* (2013.01); *C04B 2111/00853* (2013.01); *H01M 2004/021* (2013.01); *H01M 2004/027* (2013.01); *H01M 2220/10* (2013.01); *H01M 2250/10* (2013.01); *Y02E 60/50* (2013.01)

(56) References Cited

U.S. PATENT DOCUMENTS

| | | |
|---|---|---|
| 2007/0141464 A1 | 6/2007 | Fu |
| 2011/0033769 A1* | 2/2011 | Huang ................ H01M 12/005 429/465 |
| 2011/0236299 A1 | 9/2011 | Gao et al. |

FOREIGN PATENT DOCUMENTS

| | | |
|---|---|---|
| CN | 2012021269 A1 | 2/2012 |
| WO | 2011019455 A1 | 2/2011 |
| WO | 2012021269 A1 | 2/2012 |

* cited by examiner a) b) c)

d) e)

f)

METHOD FOR PRODUCING A STORAGE STRUCTURE OF AN ELECTRICAL ENERGY STORAGE CELL

CROSS REFERENCE TO RELATED APPLICATIONS

This application is the US National Stage of International Application No. PCT/EP2013/058507 filed Apr. 24, 2013, and claims the benefit thereof. The International Application claims the benefit of German Application No. DE 102012208112.7 filed May 15, 2012. All of the applications are incorporated by reference herein in their entirety.

FIELD OF INVENTION

The invention relates to a method for producing a storage structure of an electrical energy storage cell.

BACKGROUND OF INVENTION

Excess electrical energy, which originates from renewable energy sources, for example, may only be stored in the power network to a limited extent. This also applies to excess energy which arises in fossil fuel power plants when they are running in the optimally cost-effective load range, but is not retrieved from the network by the consumer. There are various large-scale storage devices for the temporary storage of this excess energy in large quantities. One of these is, for example, a pumped-storage power plant. In the battery sector, one approach for an electrical energy store is to use so-called rechargeable oxide batteries (ROB), i.e., high-temperature metal-air batteries. In these batteries, a storage medium is reduced or oxidized depending on the battery state (charging or discharging). During a plurality of these cyclic charging (i.e., reduction) and discharging (i.e., oxidation) operations of the storage medium, this medium has the tendency in the case of the applied, comparatively high operating temperatures of such a battery, which are typically between 600° C. and 900° C., that the required microstructure, in particular the pore structure of the storage medium, is impaired by sintering processes. This results in aging and subsequently failure of the battery.

SUMMARY OF INVENTION

An object of the invention is to provide a method for producing a storage structure for a storage cell of an electrical energy store, which has a higher long-term durability than the prior art and withstands a higher cycle number of charging and discharging operations.

The achievement of this object is a method for producing a storage structure having the features of the independent claim.

The method according to the invention for producing a storage structure of an electrical metal-air energy storage cell comprises an active storage material and an inert material. The method is based on the following steps:

Firstly, a porous green body is produced, which comprises the active storage material. In a further method step, this porous green body is infiltrated with an infiltration medium, wherein the infiltration medium contains the inert material. The inert material can then be present in the infiltration medium in its final form or in a chemical precursor form. Subsequently, a heat treatment of the infiltrated green body follows to produce an inert envelope structure, which at least partially envelops the grains of the active storage material.

In this case, the term inert is understood to mean that a chemical equilibrium results between the inert material and a possible reactant so slowly that no reactions occur in the case of the prevailing operating temperatures, which disadvantageously influence the functionality of the storage structure. This is understood in particular as inert behavior in relation to a gaseous or liquid reactant, which in turn undergoes a reaction with the storage material. In addition, this is also understood as an inert behavior in relation to the storage material per se. In particular, zirconium oxide, yttrium oxide, magnesium oxide, cerium oxide, aluminum oxide, or combinations thereof are used as the inert storage material.

The active storage material is present in different chemical forms during the operation of the energy storage cell (referred to hereafter in simplified form as storage cell) in dependence on its charge state. This means that the active storage material is subjected to a chemical conversion during the charging or discharging operation. This chemical conversion is linked to a continuous volume change, which is correlated in each case to the degree of conversion of the storage material. The envelope structure remains substantially dimensionally stable during this chemical conversion of the active storage material, so that it protects an individual grain of the active storage material from a sintering process during its chemical conversion. In an extreme charge state (for example, the completely discharged state), the active storage material has its greatest volume and fills up the envelope structure nearly completely in this case. In another extreme storage state (for example, the completely charged state), the active storage material has a minimal volume, wherein a cavity, which is not filled up by the storage material, is present in the interior of the envelope structure in addition to the active storage material.

Multiple envelope structures which are formed around individual grains of the active storage material in turn form a framework structure, which then implements the actual storage structure in macroscopic form.

Between the individual envelope structures, the framework structure can additionally be reinforced by further individual inert support particles, which do not necessarily have to be of the same chemical composition as the material of the envelope structure. Such support particles can form a further reinforcement of the framework structure and therefore the storage structure.

The green body, which is infiltrated in the further course of the method with the infiltration medium, can be prepared by various production methods. A particularly simple production method is the compression method in this case. In this case, a uniaxial compression method or an isostatic compression method, cold isostatic or hot isostatic, can in turn be applied. Furthermore, so-called sedimentation methods, screen printing methods, or the lamination of a green film are to be mentioned as advantageous production methods.

The green body is distinguished in that it has an open porosity, which is between 20 vol.-% and 50 vol.-%. In a further embodiment, the porosity is between 20 vol.-% and 40 vol.-%. In these porosity ranges, infiltration of the green body is particularly effective, wherein a relatively high proportion of active storage material is present after the production of the storage structure.

The infiltration medium can be provided in the form of a sol, in application of a so-called sol-gel method, in the form of a solution, or in the form of a suspension. A suspension is understood in this case as a heterogeneous material mixture made of a liquid and a solid finely distributed therein. The finely distributed solid particles are kept floating in the liquid (for example, water or alcohol) by suitable assemblies such as stirrers. In this case, an additional dispersant can be applied for assistance. The term solution is understood as the homogeneous mixture of two substances, for example, a salt in a solvent, which can again be water or alcohol in particular. After evaporation of the solvent, the dissolved material is again present in its original chemical form as a solid. A sol is understood as a base material which results in a so-called sol-gel process, which is in turn understood as a method which exists for the production of nonmetallic inorganic or hybrid-polymer materials from colloidal dispersions. The starting materials are also referred to in this case as so-called precursors. Ultrafine particles result therefrom in solutions in first base reactions. Powders, layers, or aerogels may be produced by special further processing of the sols.

In a further advantageous embodiment of the invention, the heat treatment is performed at a temperature which is between 600° C. and 1200° C., in particular between 800° C. and 1100° C. In this temperature range, an envelope structure can be prepared which is inert in relation to the temperatures which occur during operation of a storage cell.

For better infiltration or to achieve a higher degree of loading of the green body, it can be advantageous for the infiltration and/or the heat treatment operation to be repeated at least once.

The envelope structure is advantageously integrally joined to form a framework structure by the heat treatment. For example, sintering necks form in this case and an integrally-joined, stable bond occurs.

In a further advantageous embodiment of the invention, inert support particles, which ensure an open porosity between the envelope structures by supporting action over a long period of time, can be added to the green body and the infiltration medium.

Furthermore, the framework structure can be permeated by an open porosity, which enables an above-mentioned reactant to reach the individual envelope structures, penetrate them, and undergo a reaction with the active storage material in the interior of the envelope structure.

In a further embodiment of the invention, the active storage material is provided in the form of iron oxide. The iron oxide is typically provided during a production of the storage structure in the form of $Fe_2O_3$ (iron (III) oxide), the oxidation level of the iron typically changes during the operation of the storage cell, because of which the operation of the storage cell takes place with the compounds FeO (iron (II) oxide) and/or $Fe_3O_4$ (iron (II, III) oxide). The active storage material exists in particular in the form of a redox pair, which comprises iron and iron oxide, wherein the proportion of the respective components is dependent on the charge state of the electrical storage cell.

Further features of the invention and further advantages will be explained in greater detail on the basis of the following figures. The description of the figures relates to exemplary embodiments of the invention, which do not represent a restriction of the scope of protection.

DETAILED DESCRIPTION OF INVENTION

Figure 1:
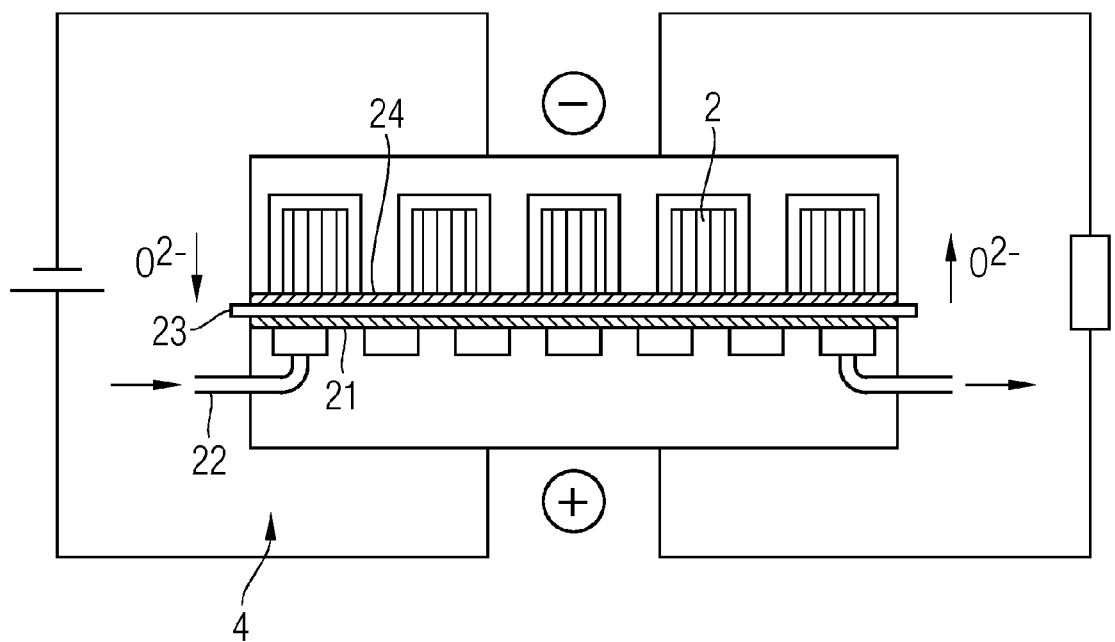
FIG. 1 shows a schematic illustration of the mode of operation of an electrical storage cell.

Firstly, the mode of operation of a rechargeable oxide battery (ROB) will be described on the basis of FIG. 1, insofar as this is necessary for the present description of the invention. A conventional construction of a ROB is that a process gas, in particular air, is blown in via a gas supply 22 to a positive electrode 21, which is also referred to as air electrode, wherein during the discharge (power circuit on the right side of the image), oxygen is withdrawn from the air. The oxygen reaches, through a solid electrolyte 23 applied to the positive electrode, a negative electrode 24 in the form of oxygen ions $O^{2-}$. This electrode is connected via a gaseous redox pair, for example, a hydrogen-water vapor mixture, to the porous storage medium in the channel structure. If a dense layer of the active storage material were present on the negative electrode 24, the charging capacity of the battery would thus be rapidly exhausted.

For this reason, it is expedient to use a storage structure 2 made of porous material on the negative electrode as an energy storage medium, which contains a functionally active oxidizable material as an active storage material 6, advantageously in the form of iron and iron oxide.

The oxygen ions transported through the solid electrolyte 23 are transported after their discharge at the negative electrode in the form of water vapor through pore channels 17 of the porous storage structure 2, which comprises the active storage material 6, via a redox pair which is gaseous in the operating state of the battery, for example, $H_2/H_2O$. Depending on whether a discharging or charging operation is present, the metal or the metal oxide (iron/iron oxide) is oxidized or reduced and the oxygen required for this purpose is delivered by the gaseous redox pair $H_2/H_2O$ or transported back to the solid electrolyte. This mechanism of the oxygen transport via a redox pair is referred to as a shuttle mechanism.

The advantage of iron as an oxidizable material, i.e., as the active storage material 6, is that during its oxidation process, it has approximately the same open-circuit voltage of approximately 1 V as the redox pair $H_2/H_2O$ at a partial pressure ratio of 1, otherwise an increased resistance results for the oxygen transport through the diffusing components of this redox pair.

The diffusion of the oxygen ions through the solid electrolyte 23 requires a high operating temperature of 600 to 900° C. of the described ROB, but this temperature range is also advantageous for the optimum composition of the redox pair $H_2/H_2O$ in equilibrium with the storage material. In this case, not only the structure of the electrodes 21 and 24 and of the electrolyte 23 is subjected to a high thermal load, but rather also the storage structure 2, which comprises the active storage material 6. During the continuous cycles of oxidation and reduction, the active storage material has the tendency to sinter, which means that the individual grains fuse more and more with one another due to diffusion processes, the reactive surface area sinks, and the continuous open pore structure required for the gas transport disappears. In the event of a closed pore structure, the redox pair $H_2/H_2O$ can no longer reach the active surface area of the active storage material 6, so that the internal resistance of the battery will be very high already after a partial discharge of the store, which prevents further technically reasonable discharge.

One advantage of the ROB is that it is modularly expandable to a nearly unlimited extent by its smallest unit, namely the storage cell. Therefore, a small battery for stationary domestic use may be prepared, and also a large-scale industrial facility for storing the energy of a power plant.

Figure 2:
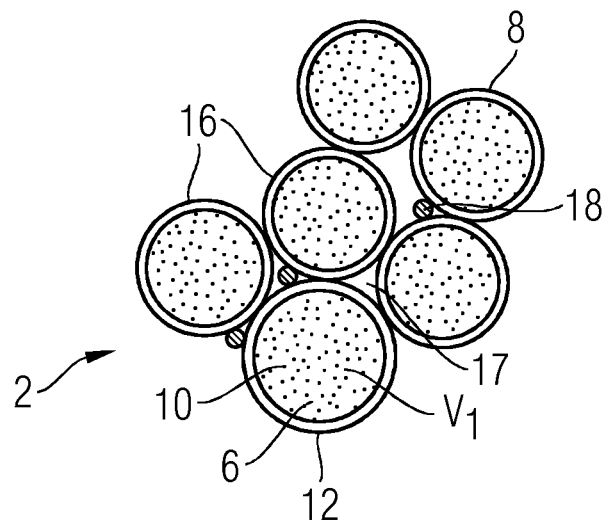
FIG. 2 shows a schematic illustration of a framework structure having envelope structures and active storage material in maximum volume state.
Figure 3:
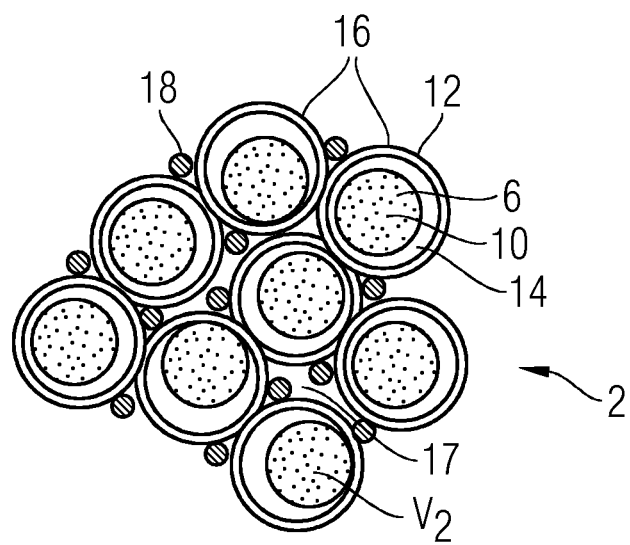
FIG. 3 shows a framework structure as in FIG. 2 with active storage material in reduced volume state.

A detail of a storage structure 2 is schematically shown in idealized form on the basis of FIGS. 2 and 3. In FIG. 2, the storage structure is provided as it appears directly after production. In the innermost region, in this case an active storage material 6 is provided, which is present in the form of grains 10. These grains 10 are in turn enclosed by an envelope structure 12, which comprises an inert material 8, for example, zirconium oxide, yttrium oxide, magnesium oxide, cerium oxide, and/or aluminum oxide and also combinations thereof. This inert material is mechanically and thermally stable, but has in this case a certain porosity. This porosity (not shown here) is capable of letting through the already described gaseous reactants in the form of $H_2/H_2O$ to the active storage material 6.

Multiple spherical envelope structures in turn result in a framework structure 16. This framework structure 16 can be constructed so that the individual envelope structures 12 are connected to one another, possibly by sintering necks, for stabilization. Furthermore, it can be expedient to intercalate further inert support particles 18 between the envelope structures 12. These inert support particles 18 are also inert, like the inert material 8 of the envelope structure 12, in relation to the reactants $H_2/H_2O$ or iron and iron oxide.

FIG. 2 shows the active storage material having its greatest volume expansion $V_1$, wherein it nearly completely fills up the envelope structure 12. This is the case, for example, when the storage cell is completely discharged, in this case the active storage material is present completely in the form of iron oxide (FeO or $Fe_3O_4$). Due to a charging process of the storage cell 2, a chemical conversion of the active storage material 6 from iron oxide into iron occurs, wherein a mixture of iron and iron oxide is present during the charging and discharging operation. Because iron in elementary form has a higher density than the iron oxide, i.e., occupies less volume, the interior of the envelope structure 12 is filled up significantly less with the active storage material 6, i.e., the elementary iron now present, in the completely charged state, which is symbolized on the basis of the volume $V_2$ in FIG. 3. Furthermore, in the envelope structure 12, a cavity 14 is now present, which is present here schematically around the grains 10, which are also schematically shown as circular, of the active storage material 6. Of course, this is only a schematic illustration, during the oxidation or reduction processes, the individual grains 10 can also disintegrate into a very large number of small partial grains, so that the cavity 14 has a significantly more irregular form than shown in FIG. 3.

During a further discharge process of the electrical storage cell 4, the active storage material 6 is now in turn converted into iron oxide, which is in turn linked to a volume increase, after which the envelope structure 12 is again filled up nearly completely with the active storage material 6 after complete charging of the storage cell 2. An essential advantage of the described storage structure can be seen herein, it enables volume differences of the active storage material to be compensated for in the microscopic scale, so that a sintering process does not take place between the active storage material and the grains 10 of the active storage material are protected by the envelope structure 12. The individual envelope structures 12 in turn mutually support one another insofar as they are connected to form the framework structure 16. The porosity, i.e., the gas permeability of the envelope structure 12, is dimensioned so that gaseous $H_2/H_2O$ can flow or diffuse to a sufficient extent through the envelope structure to ensure a suitable reaction speed for oxidation or reduction of the iron or iron oxide, respectively. The described redox pair $H_2/H_2O$ is guided in this case by pore channels 17, which extend through the framework structure 16.

Figure 4:
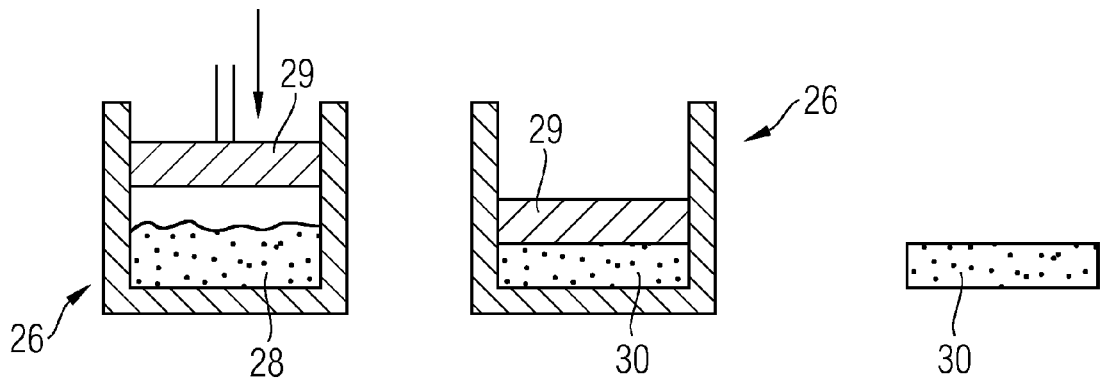
FIG. 4 shows a production method for producing a storage structure using uniaxial compression, infiltration, and heat treatment.
Figure 4:
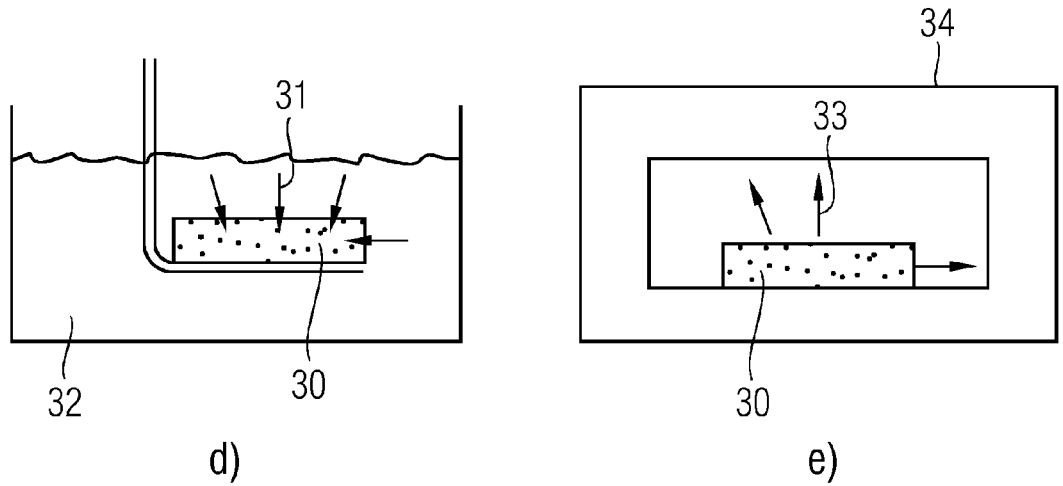
Figure 4:
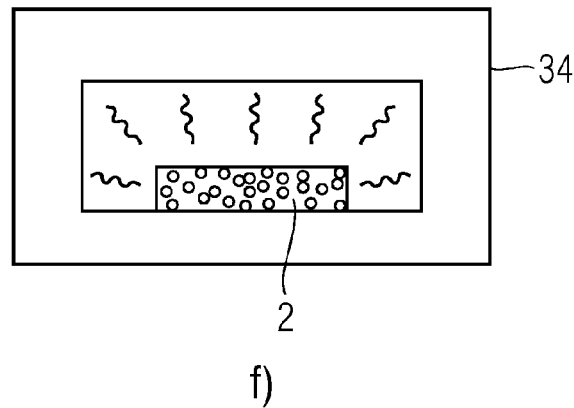

FIG. 4 shows an example of the production of a green body 30 and the infiltration thereof with an infiltration medium 32 and the heat treatment thereof for conversion of the green body 30 into the storage structure 2. In this case, firstly a powdered bulk material 28 is put into a uniaxial press 26 in a process step a. The powdered bulk material 28 is compressed to form the green body 30 by moving the pressing ram 29 in the uniaxial press, which is shown in method step b. The green body 30 is demolded as shown in c and subsequently, as schematically shown here, put into an infiltration medium 32 (d). In the infiltration medium 32, the infiltration of the green body 30 with the infiltration medium takes place, which is provided in this case in the form of a suspension made of water and zirconium oxide. The infiltration is illustrated by the arrows 31. The green body 30 which is now infiltrated is put into a heat treatment device 34, where firstly the solvent, in which the particles of the suspension are dissolved, can outgas. This outgassing of the solvent is illustrated by the arrows 33 in method step e. In a further method step, f, the temperature of the heat treatment is now increased to approximately 900° C. and sintering of the infiltrated inert zirconium oxide particles takes place, which are located in the form of an envelope around the particles of the green body 30. The particles of the green body 30 comprise the grains 10 of the storage material, as illustrated in FIG. 2. After the heat treatment process, the particles of the inert material, which is introduced by the infiltration medium 32 into the green body 30, are present in the form of the envelope structure 12 in a protective manner around the grains 10 of the storage material. The support particles 18 shown in FIG. 2, which also comprises an inert material, are solely optional in this case. Due to the sintering process, pores or openings also form in the envelope structure as a result of a surface contraction, through which the shuttle gas can flow into the interior to the active storage material.

The method shown in FIG. 4 is a combination of a uniaxial compression method for producing the green body 30 with an immersion infiltration method, wherein the capillary forces are made use of for the infiltration of the green body 30 by the infiltration medium 32. Fundamentally, there is however a plurality of different possibilities which can be combined with one another both for the production of the green body 30 and also for the infiltration thereof with the infiltration medium 32. The film drawing method will be described as an example on the basis of FIG. 5 as a further advantageous production method for the production of the green body.

Figure 5:
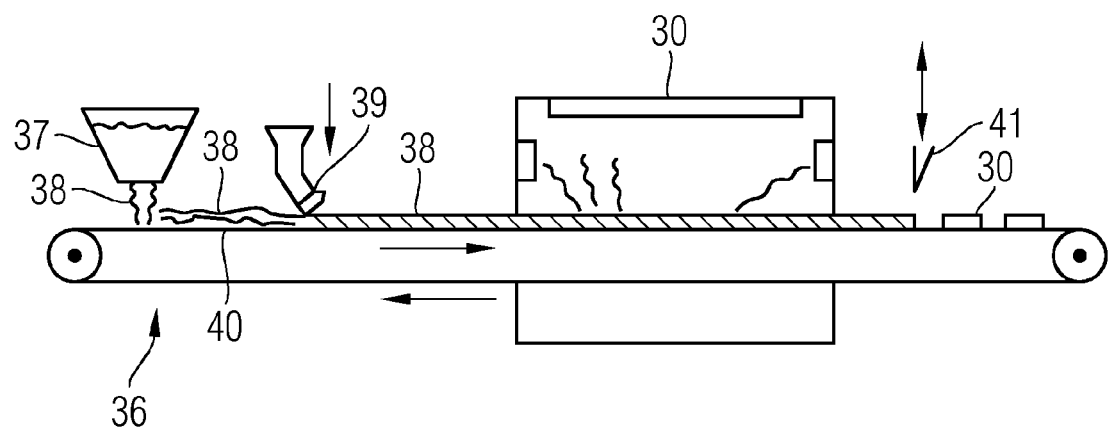
FIG. 5 shows a method for producing a green body via green film drawing.

FIG. 5 shows a film drawing facility 36, wherein a precursor 38 (which does not necessarily have to be identical to the precursor for a sol-gel process) is put onto a conveyor belt 40 from a storage container 37. The compound of the precursor is spread flat by a doctor blade 39 and subjected in a heat treatment device 34 (designed in this form differently than in FIG. 4) to a heat treatment. After the conveyor belt has conveyed the film out of the heat treatment device 34, the green body 30 now resulting is cut into corresponding parts by a cutting tool 41. These parts of the green body 30 can optionally be stacked on one another and laminated, to thus adapt the required height of the green body accordingly.

Figure 6:
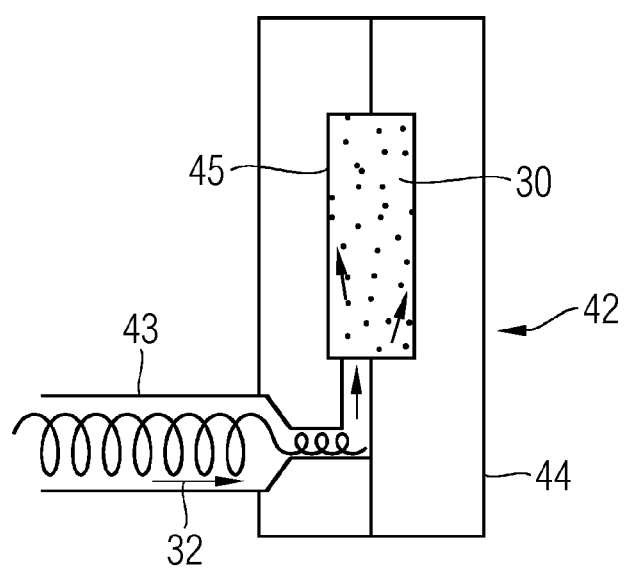
FIG. 6 shows a pressure infiltration of a green body.

FIG. 6 shows an alternative method for the infiltration method to the immersion infiltration method according to FIG. 4. FIG. 6 relates to a pressure infiltration method. In this case, the green body 30 is put into a pressure infiltration device 42, wherein the pressure infiltration device 42 comprises a pressure infiltration tool 44 and an extruder 43. The green body 30 is deposited in a mold cavity 45 of the pressure infiltration tool 44 in this case so that as few as possible bending and shear forces act thereon. The infiltration medium 32 is pressed by the extruder 43, similarly to an injection molding method, at high pressure into the mold cavity 45, which is occupied with the green body 30. The infiltration medium is pressed by the high pressure of the extrusion method into the pores of the green body. It is fundamentally also possible to use a device which functions similarly to metal die casting and using which the infiltration medium 32 is pressed with high pressure in liquid form into the green body 30.

The described framework structure, which is constructed from the various envelope structures, has a relatively small volume proportion, which is advantageously less than 20 vol.-%, in relation to the total volume of the storage structure 2. A very high mechanical strength is implementable with this comparatively small volume proportion by way of the described methods in the described embodiment of the storage structure. This mechanical strength also exists at high temperatures, which are present in operation of the ROB at 600° C. to 900° C. Using this high strength of the framework structure 16, a high number of oxidation and reduction cycles is possible, in which the volume of the grains 10 of the active storage material 6 expands and contracts again and wherein the envelope structure 12 remains substantially unchanged, in particular undamaged. Of course, the envelope structure 12 or the inert material 8 is also subject to changes at the described high temperatures and in the aggressive chemical environment, which can take place in the form of chemical surface reactions or diffusion processes, for example. However, the structure of the envelope structure 12 remains substantially in existence and functional.

By way of the described storage structure, it is possible to ensure a flexible and cost-effective production, which is reproducible in large industrial scale, of the storage structure, which is also applicable to various metal storage materials and envelope materials.

The invention claimed is:
1. A method for producing a storage structure of an electrical metal-air energy storage cell comprising an active storage material and an inert material, the method comprising:
   producing a porous green body, which comprises the active storage material,
   infiltrating the porous green body with an infiltration medium, which contains the inert material, and
   heat treating the infiltrated green body to produce an inert envelope structure, which at least partially envelops the grains of the active storage material.
2. The method as claimed in claim 1,
wherein the green body is produced by a compression method, a sedimentation method, a screen printing method, or by lamination of a green film.
3. The method as claimed in claim 1,
wherein the green body has an open porosity between 20 vol.-% and 50 vol.-%.
4. The method as claimed in claim 1,
wherein the infiltration medium is provided in the form of a sol, a solution, or a suspension.
5. The method as claimed in claim 1,
wherein the heat treatment takes place at a temperature between 600° C. and 1200 ° C.
6. The method as claimed in claim 1,
wherein the infiltration operation and/or the heat treatment operation is repeated at least once.
7. The method as claimed in claim 1,
wherein envelope structures of individual storage material grains are connected in a formfitting manner by the heat treatment to form a framework structure.
8. The method as claimed in claim 1,
wherein inert support particles are added to the green body and/or the infiltration medium.
9. A storage structure produced by the method of claim 1,
wherein the active storage material is provided in the form of iron oxide.
10. The method as claimed in claim 1,
wherein the green body has an open porosity between 20 vol.-% and 40 vol.-%.
11. The method as claimed in claim 1,
wherein the heat treatment takes place at a temperature between 800° C. and 1100 ° C.

* * * * *